(12) United States Patent
Stare et al.

(10) Patent No.: US 12,192,131 B2
(45) Date of Patent: Jan. 7, 2025

(54) POSITIONING REFERENCE SIGNALING

(71) Applicant: Telefonaktiebolaget LM Ericsson (publ), Stockholm (SE)

(72) Inventors: Erik Stare, Sollentuna (SE); Per Ernström, Stockholm (SE); Fredrik Gunnarsson, Linköping (SE); Iana Siomina, Täby (SE)

(73) Assignee: Telefonaktiebolaget LM Ericsson (PUBL) (SE)

( * ) Notice: Subject to any disclaimer, the term of this patent is extended or adjusted under 35 U.S.C. 154(b) by 740 days.

(21) Appl. No.: 17/421,951

(22) PCT Filed: Jan. 9, 2020

(86) PCT No.: PCT/SE2020/050012
§ 371 (c)(1),
(2) Date: Jul. 9, 2021

(87) PCT Pub. No.: WO2020/145873
PCT Pub. Date: Jul. 16, 2020

(65) Prior Publication Data
US 2022/0116169 A1    Apr. 14, 2022

(30) Foreign Application Priority Data
Jan. 11, 2019  (SE) .................................. 1900005-8

(51) Int. Cl.
*H04L 5/00* (2006.01)
*H04L 27/26* (2006.01)
(52) U.S. Cl.
CPC ........ *H04L 5/0048* (2013.01); *H04L 27/2613* (2013.01)

(58) Field of Classification Search
CPC .......................... H04L 5/0048; H04L 27/2619
USPC ......................................................... 370/379
See application file for complete search history.

(56) References Cited

U.S. PATENT DOCUMENTS

| 2018/0115448 A1* | 4/2018 | Ramanujam | H04W 72/121 |
| 2019/0289591 A1* | 9/2019 | Lin | H04L 1/1861 |
| 2020/0150254 A1* | 5/2020 | Manolakos | H04W 64/006 |

OTHER PUBLICATIONS

3GPP TSG RAN WG1 Meeting #95 R1-1812337 Nov. 2018 (Year: 2018).*
3GPP TSG RAN WG1 Meeting #94bis R1-1810461 Oct. 2018 (Year: 2018).*
3GPP TSG RAN WG1 Meeting #98bis R1-1911343 Oct. 2019 (Year: 2019).*
International Search Report and Written Opinion dated May 8, 2020 for International Application No. PCT/SE2020/050012 filed Jan. 9, 2020, consisting of 11-pages.

(Continued)

*Primary Examiner* — William Nealon
(74) *Attorney, Agent, or Firm* — Weisberg I.P. Law, P.A.

(57) ABSTRACT

There is disclosed a method of operating a network node in a radio access network, the method including transmitting reference signaling based on a reference signaling configuration, the reference signaling configuration corresponding to a comb-n structure for a symbol group of a slot, wherein the reference signaling configuration corresponds to a staggered and/or re-ordered comb-n structure for one or more other symbol groups of the slot. The disclosure also pertains to related devices and methods.

16 Claims, 12 Drawing Sheets

(56) References Cited

OTHER PUBLICATIONS

3GPP TSG RAN WG1#57b R1-092354; Title: Consideration on PRS pattern design; Agenda Item: 11; Source: Huawei; Document for: Discussion & Decision; Date and Location: Jun. 29-Jul. 3, 2009, Los Angeles, US, consisting of 10-pages.
3GPP TSG RAN WG1 #57 bis R1-092482; Title: Details on PRS Pattern; Agenda Item: 11; Source: LG Electronics; Document for: Discussion and decision; Date and Location: Jun. 29-Jul. 3, 2009, Los Angeles, USA, consisting of 9-pages.
3GPP TSG-RAN WG1 Meeting #94bis R1-1810461; Title: Views on potential techniques for NR positioning; Agenda tem: 7.2.10.3; Source: MediaTek Inc.; Document for: Discussion; Date and Location: Oct. 8-12, 2018, Chengdu, China, consisting of 8-pages.
3GPP TSG-RAN WG1 Meeting #94bis R1-1811287; Title: Considerations on NR Positioning using PRS; Agenda Item: 7.2.10.3; Source: Qualcomm Incorporated; Document for: Discussion and Decision; Date and Location: Oct. 8-12, 2018, Chengdu, CN, consisting of 8-pages.
3GPP TSG RAN WG1 Meeting #95 R1-1812337; Title: Considerations on Techniques for NR positioning; Agenda Item: 7.2.10.3; Source: Vivo; Document for: Discussion and Decision; Date and Location: Nov. 12-16, 2018, Spokane, USA, consisting of 8-pages.
3GPP TSG-RAN WG1 Meeting #95 R1-1812373; Title: Views on potential positioning techniques; Agenda Item: 7.2.10.3; Source: MediaTek, Inc.; Document for: Discussion; Date and Location: Nov. 12-16, 2018, Spokane, USA, consisting of 6-pages.

\* cited by examiner

POSITIONING REFERENCE SIGNALING

CROSS-REFERENCE TO RELATED APPLICATIONS

This application is a Submission Under 35 U.S.C. § 371 for U.S. National Stage Patent Application of International Application No.: PCT/SE2020/050012, filed Jan. 9, 2020 entitled "POSITIONING REFERENCE SIGNALING," which claims priority to Swedish Patent Application No.: 1900005-8, filed Jan. 11, 2019, the entireties of both of which are incorporated herein by reference.

TECHNICAL FIELD

This disclosure pertains to wireless communication technology, in particular regarding Positioning Reference Signaling (PRS).

BACKGROUND

Many applications of wireless communication technology use positioning of mobile devices. To facilitate positioning, radio networks often provide reference signaling, in particular specific reference signaling, called Positioning Reference Signals. A problem with PRS transmitted by a network node is that they use resources, and may lead to interference with other signals, in particular with PRS from other network nodes, which may be transmitted simultaneously.

SUMMARY

It is an object of the present disclosure to provide approaches allowing improved reference signaling, in particular for positioning. The approaches are particularly advantageously implemented in a 5th Generation (5G) telecommunication network or 5G radio access technology or network (RAT/RAN), in particular according to 3GPP (3$^{rd}$ Generation Partnership Project, a standardisation organization). A suitable RAN may in particular be a RAN according to NR, for example release 15 or later, or LTE Evolution.

Accordingly, there is disclosed a method of operating a network node in a radio access network. The method comprises transmitting reference signaling based on a reference signaling configuration, the reference signaling configuration corresponding to a comb-n structure for a symbol group of a slot. The reference signaling configuration corresponds to a staggered and/or re-ordered comb-n structure for one or more other symbol groups of the slot.

Moreover, a network node for a radio access network is described. The network node is adapted for transmitting reference signaling based on a reference signaling configuration. The reference signaling configuration corresponds to a comb-n structure for a symbol group of a slot, wherein the reference signaling configuration corresponds to a staggered and/or re-ordered comb-n structure for one or more other symbol groups of the slot. The network node may comprise, and/or be adapted for utilising, processing circuitry and/or radio circuitry, in particular a transmitter and/or receiver and/or transceiver, for transmitting the reference signaling, and/or for receiving a configuration and/or a report.

A method of operating a user equipment in a radio access network is considered. The method comprises receiving reference signaling based on a reference signaling configuration, the reference signaling configuration corresponding to a comb-n structure for a symbol group of a slot. The reference signaling configuration corresponds to a staggered and/or re-ordered comb-n structure for one or more other symbol groups of the slot.

In addition, a user equipment or wireless device for a radio access network may be considered. The wireless device is adapted for receiving reference signaling based on a reference signaling configuration, the reference signaling configuration corresponding to a comb-n structure for a symbol group of a slot. The reference signaling configuration corresponds to a staggered and/or re-ordered comb-n structure for one or more other symbol groups of the slot. The UE or wireless device may comprise, and/or be adapted for utilising, processing circuitry and/or radio circuitry, for receiving the configuration and/or the reference signaling, and/or for transmitting and/or determining a report based on the reference signaling.

The reference signaling may in particular be PRS. In some cases, the reference signaling (RS) may cover one or more, e.g. two, slots at each occasion, wherein for each frame there may be one or more occasions, which may be periodically. Between occasions, there may be intervals without the RS (however, other signaling and/or reference signaling may occur). The reference signaling configuration may correspond a number P of symbols in a slot carrying reference signaling, e.g. P=12, 13 or 14. Thus, the resources may be used efficiently.

Reference signaling may comprise non-zero power resource elements, on which power may be transmitted. Such elements may also be referred to as non-zero energy or non-zero (resource) elements. There may also be considered zero-power resource elements, on which no power may be transmitted. Between non-zero power resource elements, one or more zero-power resource elements may be arranged, e.g., in time domain and/or in particular in frequency domain. In some cases, zero power elements may be arranged between groups of non-zero power resource elements, wherein a group may extend over g1 subcarriers (corresponding to resource elements) in frequency and/or g2 (or m) symbols in time. A configuration may correspond to such an arrangement. A symbol group may in general correspond to one or more symbols to which a frequency distribution of zero-power and non-zero power REs may be applied, e.g. to cover a PRB or more than one PRB. For each symbol in a group, the frequency distribution may be the same or essentially the same. A reference signaling configuration may correspond to a sequence of modulation symbols being associated to non-zero power resource elements, e.g. based on a gold sequence or similar, and/or a code being used for mapping symbols to resource elements. For example, an orthogonal cover code (OCC) may be utilised.

Receiving reference signaling may comprise assigning received signaling to a time and/or frequency distribution according to a reference signaling configuration, and/or performing demodulation based on the configuration. Receiving reference signaling may comprise estimating a radio condition parameter and/or parametrisation, e.g. a CIR and/or TOA and/or differences in TOA, and/or providing position information and/or a report, e.g. to a network node or a network. Receiving reference signaling may comprise receiving reference signaling based on a plurality of configurations and/or from a plurality of network nodes. In particular TOA or differences in TOA may be determined based on multiple reference signalings from multiple network nodes. A wireless device may be configured or configurable accordingly, e.g. by one or more network nodes.

A comb-n structure may correspond to a structure in which in frequency domain each n-th resource element or element group for a symbol or symbol group corresponds to a non-zero power resource element or element group, wherein between non-zero power elements or element groups, there are (n−1) zero-power elements or element groups (the elements/element groups for non-zero power and zero-power may be considered to have the same size for each distribution). An instance of a comb may be considered to consist of a non-zero power resource element or resource element group with associated n−1 zero-power resource elements (which may be arranged above and/or below the non-zero power ones in frequency domain). In a slot, multiple combs may be arranged at different time (corresponding to different symbol groups having associated different combs, some of which may be shifted in frequency to each other (e.g., by one or more subcarriers). Each symbol group carrying non-zero power resource elements of the reference signaling may have a comb-n structure with the same n over a slot or occurrence or occasion.

It may be considered that all symbol groups in a slot and/or occasion have the same duration in number of symbols. Thus, an even distribution in time can be achieved.

In general, a symbol group may have a length of m in symbols, wherein m may in particular be m=1 or m=2. For m=2, the non-zero power elements on the same frequency/subcarrier may be utilised as cyclic prefix or postfixes, e.g. for improved demodulation. For m=1, more detailed patterns of frequency distribution over a slot are available.

A staggered comb-n structure may in general correspond to a frequency distribution over a symbol group shifted by k subcarriers for each shift in time corresponding to a length of the symbol group, wherein k may in particular be k=1 or k=2 or k=−1 or k=−2 or k=7 or k=−7 or k=14 or −14. The shift may be circular. Thus, frequency diversity may be improved and/or the resource elements of a PRB in a slot may be used efficiently and/or evenly.

A re-ordered comb-n structure may correspond to a time/frequency distribution of reference signaling that may be achieved by redistributing symbol groups of a staggered comb-n structure in the slot. Thus, for a slot, the re-ordered comb-n structure may use the same REs as the staggered comb-n structure, but at a different order in time.

A reordered comb-n structure may in general correspond to a time/frequency distribution of reference signaling covering a plurality of symbol groups being repeated at least once in a slot, which may correspond to at least two instances of the time/frequency distribution occurring. This may pertain to a PRB or a PRB pair in frequency space. Thus, even use of resource is provided, which in particular may be useful of low-latency applications.

The comb-n may be a comb-6. Such a comb allows an even number of comb instances in a PRB.

In an alternative example, the comb-n may be a comb-12, which corresponds to one comb instance in a PRB.

In general, the reference signaling may be power-boosted, e.g. by a factor of b, wherein b may be n. The boosting may correspond to transmitting on the non-zero power resource elements with a power that is b-times a reference power, e.g. power used for resource elements of SSB signaling and/or broadcast signaling or PDSCH or PDCCH signaling. Thus, the range and/or signal quality may be improved, and/or the accumulated transmission power remains stable, improving power amplifier usage.

It may be considered that in time domain, before and/or after a non-zero power resource element (or resource element group) of a symbol group, there may be a zero-power resource element. Alternatively, or additionally, before and/or or each occurrence, and/or in the first symbol and/or last symbol of a slot), a zero-power symbol (zero power resource elements for all subcarriers of a PRB) may be present. This may correspond to a guard interval.

In some cases, there may be considered that the reference signaling configuration corresponds to a punctured distribution, in which a one or more resource elements of a staggered and/or re-ordered comb-n may be muted. A muted comb-n (or comb-n structure) may correspond to a comb-n (or comb-n structure) differing from a staggered and/or re-ordered comb-n (or comb-n structure) in that one or more non-zero power elements of the staggered and/or re-ordered comb-n are zero-power elements in the muted comb-n.

There is also considered a program product comprising instructions adapted for causing processing circuitry to control and/or perform a method as described herein. Moreover, a carrier medium arrangement carrying and/or storing a program product as described herein may be considered. A system comprising a network node and a UE as described herein is also described, as well as an associated information system. In general, there may be considered a method of operating a network node comprising, and/or a network node adapted for performing, transmission of reference signaling according to any example described herein. Also, there may be considered a method of operating a UE comprising, and/or a wireless device adapted for performing, reception of reference signaling according to any example described herein.

There may be considered a configuring network node adapted for configuring a radio node with a reference signaling configuration. The radio node may be a radio network node (which in general may, for example, be a base station and/or gNB or IAB node and/or radio access providing node), in which case the configuring network node may in particular be another radio network node, or a higher-layer node or function, e.g. a LMF node and/or E-SMLC node or similar. In some cases, the radio node may be a UE, in which case the configuring network node may in particular be a radio network node as described herein. A corresponding method of operating a configuring network node may be considered. The network node may comprise processing circuitry and/or communication circuitry and/or a communication interface to configure the radio node. In some cases, configuring may comprise configuring a plurality of radio nodes, in particular a plurality of radio network nodes, with different reference signaling configuration, in which case for example different comb-n structures and/or different sequences and/or codes may be configured. Alternatively, or additionally, configuring may comprise configuring a UE with corresponding multiple reference signaling configurations, e.g. via a radio network node.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
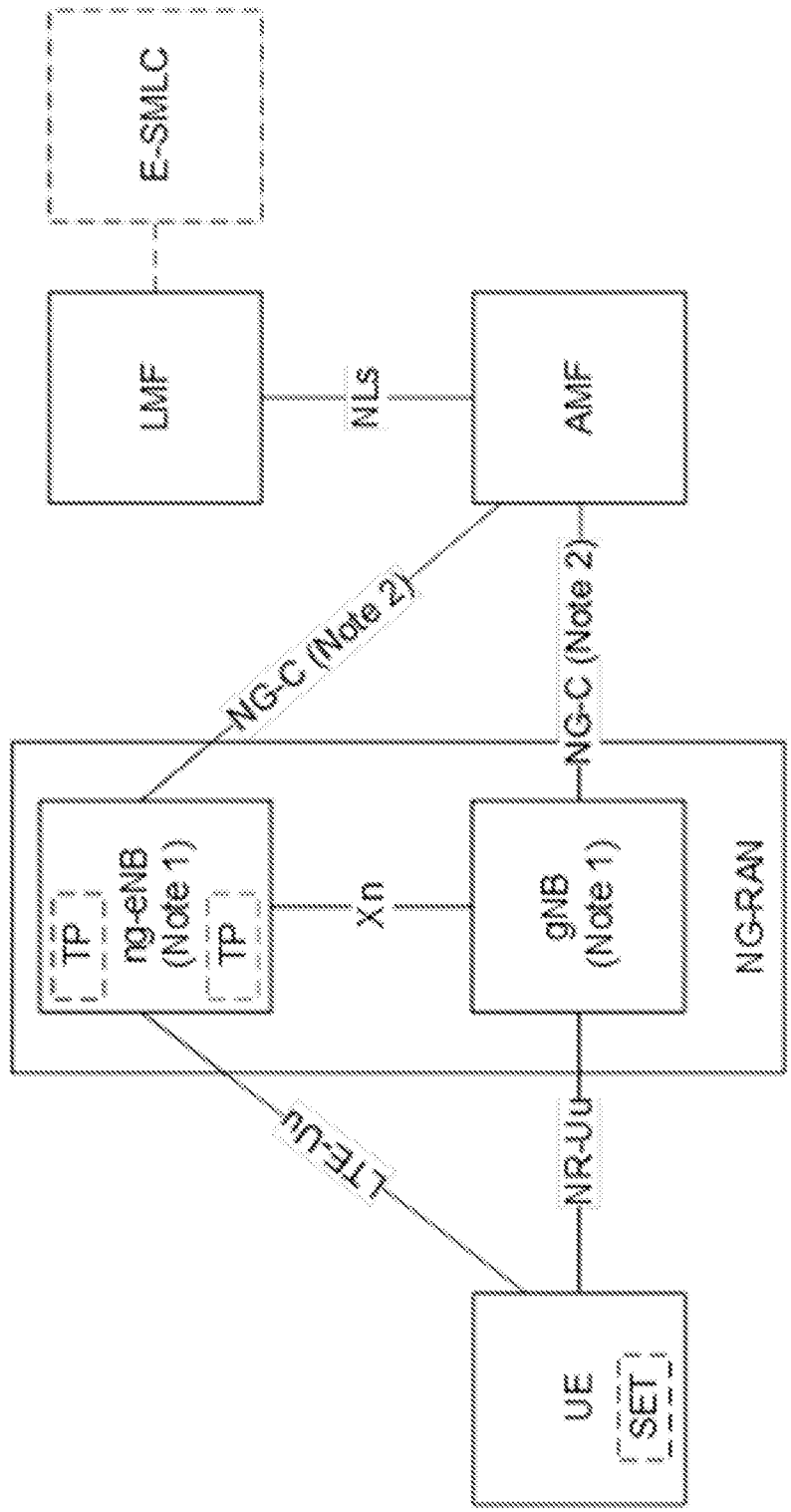
FIG. 1, schematically showing an exemplary positioning architecture.

In the following, concepts and approaches are described in the context of NR technology. However, the concepts and approaches may be applied to other RATs.

One class of positioning methods is based on the principle of Observed Time Difference Of Arrival (OTDOA), where e.g. a User Equipment (UE) receives signals from at least three Base Stations (BS) with known geographical locations and by pairwise determination of the OTDOA between received BS signals the UE may, via so-called triangulation, estimates its position. The OTDOA between two BS signals is typically performed by comparing the estimated Channel Impulse Response (CIR) of each received BS signal. The results of the OTDOA measurements may either be used by the UE or send to the network, which uses it for estimation of the UE's position.

For the UE to be able to estimate the OTDOA between two BSs, e.g. by estimating the CIR of each transmitted BS signal, the signals transmitted from the respective BSs may include a Positioning Reference Signal (PRS) that is a priori-known to the UE, e.g. specified in the standard being used or by using demodulated and re-modulated data instead of, or as a complement to, dedicated PRS signals.

By comparing the received PRS with a local version or a known signal form, e.g. via correlation, the UE may estimate the CIR of the received PRS signal from a particular BS. By using the estimated CIRs from at least three BSs the UE (or network) may pairwise compare the OTDOA between these and use these estimates as a basis for an estimation of its position. The quality of this estimation is however affected by the Signal-to-Interference-and-Noise Ratio (SINR) of the received PRSs. A potential source of interference, when estimating a CIR from one BS is the received PRSs from other BSs.

One way of reducing such interference is to allow different—especially adjacent—BSs to transmit orthogonal PRSs. In OFDM such orthogonality may naturally be achieved by using different (non-overlapping) sets of Resource Elements (REs) in an OFDM symbol for the PRSs originating from different BSs.

To keep latency and/or overhead limited some BSs in a network may however need to use overlapping sets of REs, so that some REs are used by more than one BS. This introduces a degree of interference when a UE receives signals from several BSs on the same REs. There is therefore a trade-off between latency & overhead on the one hand and the degree of interference on the other hand. Overlapping REs may be introduced in a systematic way by applying a frequency reuse technique. This means that e.g. adjacent BSs are received with orthogonal PRSs, but more far-away BSs, where the same REs are reused, are received with interference, since they are non-orthogonal. To reduce the negative impact of such interference some form of coding may be applied on non-orthogonal PRSs, so that e.g. the effect of the interferer is noise-like.

An important objective of positioning is to fulfill regulatory requirements for emergency call positioning. Positioning in NR is proposed to be supported by the architecture shown in FIG. 1, which is based on LCS protocols. LMF is the location server in NR, there may be one or more base stations in form of a ng-eNB or a gNB, to form a radio access network according to NR (the NG-RAN). Base stations may communicate with each other via an Xn interface. NR-Uu indicates the air interface between the RAN and the UE, which may carry reference signaling like PRS. A base station may communicate with the Access and Mobility Function (e.g., a server/MME) via a NG-C interface. There are also interactions between the location server LMF and the gNodeB via the NRPPa protocol and/or NLs interface. The interactions between the gNodeB and the device like a UE is supported via the Radio Resource Control (RRC) protocol. The LMF may communicate with a higher layer function E-SMLC.

In FIG. 1, the following notes apply:

Note 1: The gNB and ng-eNB may not always both be present.

Note 2: When both the gNB and ng-eNB are present, the NG-C interface is only present for one of them.

For positioning, one or more of several approaches may be supported:

Enhanced Cell ID. Essentially cell ID information to associate the device to the serving area of a serving cell, and then additional information to determine a finer granularity position.

Assisted GNSS (Global Navigation Satellite Service). GNSS information retrieved by the device, supported by assistance information provided to the device from E-SMLC OTDOA (Observed Time Difference of Arrival). The device estimates the time difference of reference signals from different base stations and sends to the E-SMLC for multilateration.

UTDOA (Uplink TDOA). The device is requested to transmit a specific waveform that is detected by multiple location measurement units (e.g. an eNB) at known positions. These measurements are forwarded to E-SMLC for multilateration NR radio-technology is uniquely positioned to provide added value in terms of enhanced location capabilities. The operation in low and high frequency bands (e.g., below and above 6 GHz) and utilization of massive antenna arrays provides additional degrees of freedom to substantially improve the positioning accuracy. The possibility to use wide signal bandwidth in low and especially in high bands brings new performance bounds for user location for well-known positioning techniques based OTDOA and UTDOA, Cell-ID or E-Cell-ID etc., utilizing timing measurements to locate UE. The recent advances in massive antenna systems (massive MIMO) can provide additional degrees of freedom to enable more accurate user location by exploiting spatial and angular domains of propagation channel in combination with time measurements.

Specific Positioning Reference Signals (PRS) may be used if the required high probability of detection cannot be guaranteed with other non-specific reference signaling. A neighbor cell with its synchronization signals (Primary-/Secondary Synchronization Signals) and reference signals may be seen as detectable, when the Signal-to-Interference-and-Noise Ratio (SINR) is at least −6 dB. Simulations during standardization have shown, that this can be only guaranteed for 70% of all cases for the 3rd best-detected cell, means 2nd best neighboring cell. This is not enough and has been assumed an interference-free environment, which cannot be ensured in a real-world scenario. However, PRS in some variants may be implemented as pseudo-random QPSK sequence that is being mapped in diagonal patterns with shifts in frequency and time to avoid collision with cell-specific reference signals (if present, e.g. in LTE) and an overlap with the control channels (PDCCH).

Reference signaling like PRS may be isolated/orthogonalised in several different ways, e.g.
1. Code domain: Each cell transmits a different PRS sequence (orthogonal to other PRS sequences in the code domain).
2. Frequency domain: PRS has a frequency re-use of six, i.e., six possible frequency arrangements (called frequency offset) is defined within the PRS bandwidth. If two cells have the same frequency offset, the PRSs collide in frequency domain. In such cases, the isolation from the orthogonal PRS sequences distinguishes one cell from the other.
3. Time domain: If PRSs collide in the frequency domain, muting (time-based blanking) can make the PRS occasions again appear orthogonal to each other.

A comb structure with comb-n for reference signaling may be considered, in particular in frequency domain. That means that frequency shifts give n orthogonal patterns in the frequency domain. In general, TRS may be used for positioning, and depending on their form may be considered a form of PRS.

Herein proposed reference signaling may be used as PRS. The signaling is based on one or more sequences of OFDM symbols with non-zero REs regularly inserted in the OFDM symbols so that every nth RE is used and other REs have zero energy (in frequency domain). This particular structure is called comb-n. From a particular BS the transmitted comb-n may be staggered with a factor k, e.g. shifted in frequency k RE positions in each of successive symbols. After n/k symbols, a full cycle of the staggering may have occurred, after which either the PRS occurrence is concluded or a new cycle is transmitted, e.g. until the end of the occurrence. Each occurrence may correspond to one or more slots of transmission of the reference signaling, e.g. one or two slots. The slots may in particular be configured for TRS and/or PRS signaling.

Based on this basic and regular sequence of symbols one may also re-order the symbols, so that the total set of transmitted symbols are the same, but they are transmitted in a different order. This may have two types of advantages: in latency-critical cases, it may allow UEs to stop receiving symbols before the end of an occurrence, and use only the received symbols for the TOA estimation. Such re-ordering may allow a UE to maximize the possible delay range it can cover, limited by the RE density in a time-averaged symbol, given the limited received number of symbols. Quasi-optimum range performance for any number of received symbols may be achieved. Another advantage of the re-ordering is that REs may become more evenly distributed in time and frequency, which is beneficial when the channel has variations both in frequency and time. Examples of particular PRSs are described for comb-6, comb-7, comb-12 and comb-14, with re-ordering given for comb-6 using staggering with K=1.

To improve performance in situations with inter-symbol interference (ISI), zero-power symbols may be included at both time ends of the PRS occasion (e.g., first and last symbol of the occurrence and/or slot or slot pair).

Transmission may also be done using groups of identical OFDM symbols using a certain shift, followed by an equally long group (e.g., covering two or more symbols) using another shift etc. In this way, ISI may be eliminated by using the previous or following symbols as a kind of CP. Code sequences, e.g. Gold codes, may be applied to the reference signaling, e.g. using different codes for different Base Stations (BS) and/or different codes for different OFDM symbols, or OFDM symbol groups, in case there are identical symbols in a group. A code may indicate a sequence of modulation symbols to be used on the resources for the reference signaling. Zero-power symbols may be effectively a part of a pre-defined PRS pattern or determined based on one or more pre-defined rules. Alternatively, the zero-power symbols configuration may be signaled between the respective nodes, e.g., any one or more apply: from a controlling node (e.g., O&M, SON, LMF, etc.) to BS, from BS to location server, from location server to UE, from BS to one or more UE, from one BS to another BS.

In another variant, the UE may be allowed to drop, or alternatively assume no presence of, the last N1 symbols (N1 may depend on the numerology of PRS and the concerned N1 symbols) of the preceding subframe to the PRS occasion and the first N2 symbols (N2 may depend on the numerology of PRS and the concerned N2 symbols) of the subframe after the PRS occasion, where at least one of N1 and N2 are positive numbers.

Furthermore, the network node may adapt its scheduling to not schedule any transmission (by radio network node or UE) and/or reception in the concerned N1 and/or N2 symbols. The N1 and N2 symbols may be DL or UL symbols. This variant may also be combined with other variants herein. The values of or the rules for determining N1 and N2 may be pre-defined or may be configurable and signaled similar to zero-power symbols as described above.

For some variants, (arbitrary) muting may be considered, in which case one, several or all of the BSs employ a muting pattern, so that one or more, or each BS is silent for parts of the time and/or on part of the frequency domain. The muting pattern may be indicated to a UE, e.g. configured using higher-layer signaling like RRC or MAC signaling.

Figure 2:
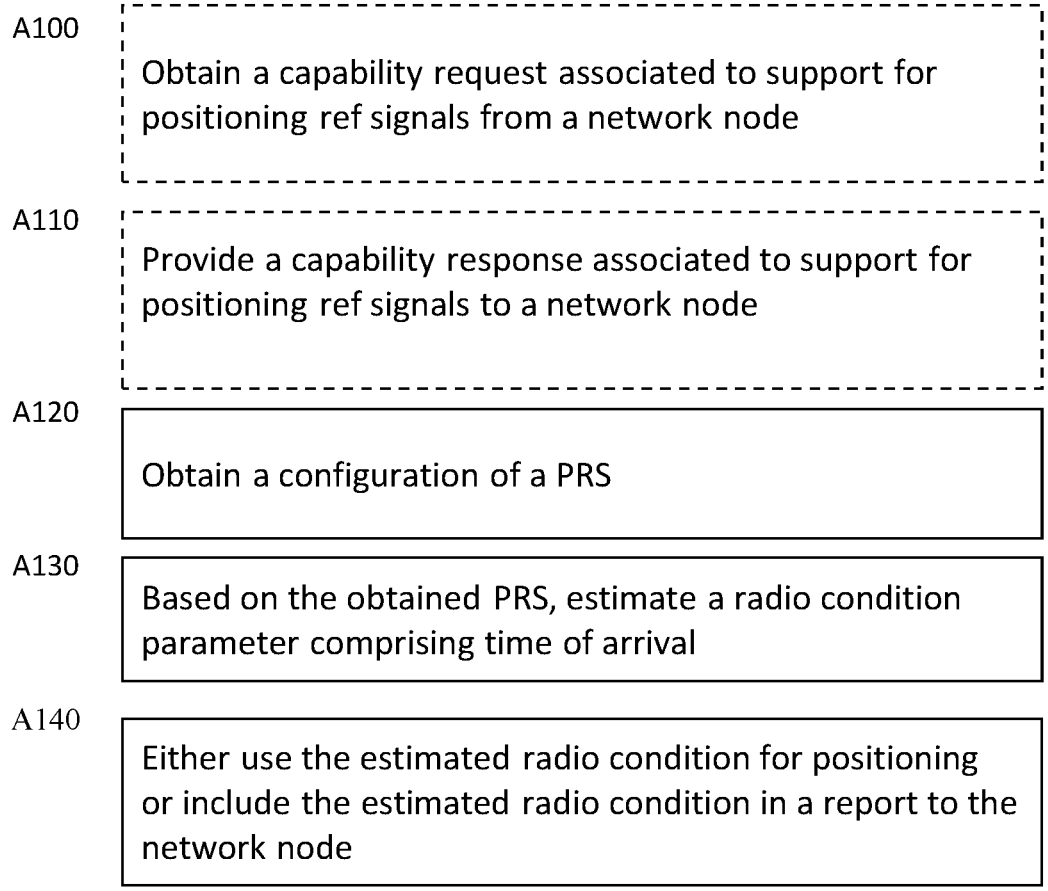
FIG. 2, showing a flowchart of an exemplary method of operating a wireless device.

FIG. 2 shows an optional method of operating a user equipment, which may be adapted to perform such a method. In an action A100, the UE may obtain a capability request to support positioning, e.g. based on positioning reference signaling, from a network node, e.g. receiving a corresponding request. In an action A110, it may provide a corresponding capability response to the network node. The response may indicate the capability of the UE to receive and/or evaluate reference signaling, and/or whether and/or how it is able to provide positioning information and/or measurement information based on (positioning) reference signaling.

Instead of a response, corresponding capability information may be provided to the network node without request from the network, e.g. when registering with the network and/or cell. In an action 120, the UE may receive a configuration of PRS, e.g. configured by the network or network node. Several PRS structures and/or configurations may be obtained, which may pertain to one or more BS, and/or which may be configured by one BS (e.g., for itself and/or neighbouring BS or nodes) or multiple BSs. In an action A130, the UE may, based on obtained (e.g., received) reference signaling (from one or more BS), in particular PRS, estimate a radio condition parameter or parametrisation (e.g., CIR, and/or signal quality and/or delay and/or TOA), in particular TOA. In an action A140, the UE may perform position estimating based on the radio condition parametrisation (which may comprise one or more parameters in general), and/or provide a report based on the parametrisation and/or the position estimate. A report may generally be provided to the network, e.g. the base station and/or LMF and/or E-SMLC.

Figure 3:
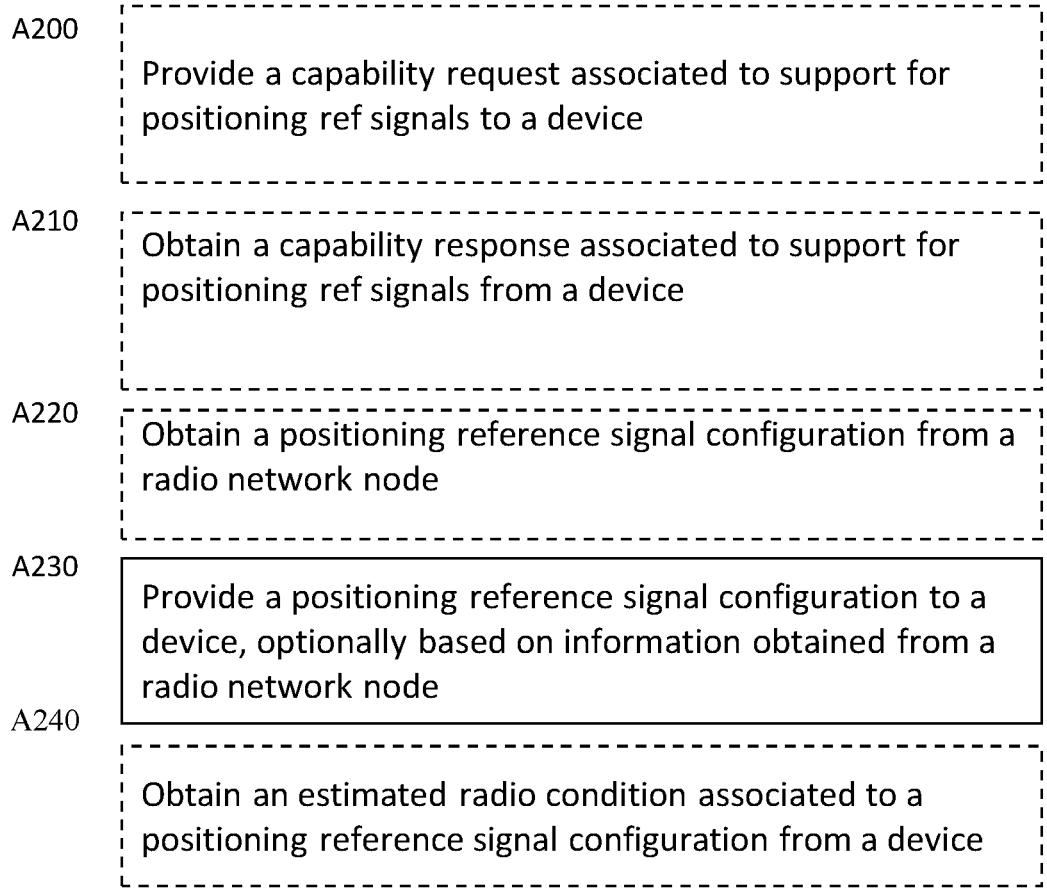
FIG. 3, showing a flowchart of an exemplary method of operating a network node.
Figure 4:
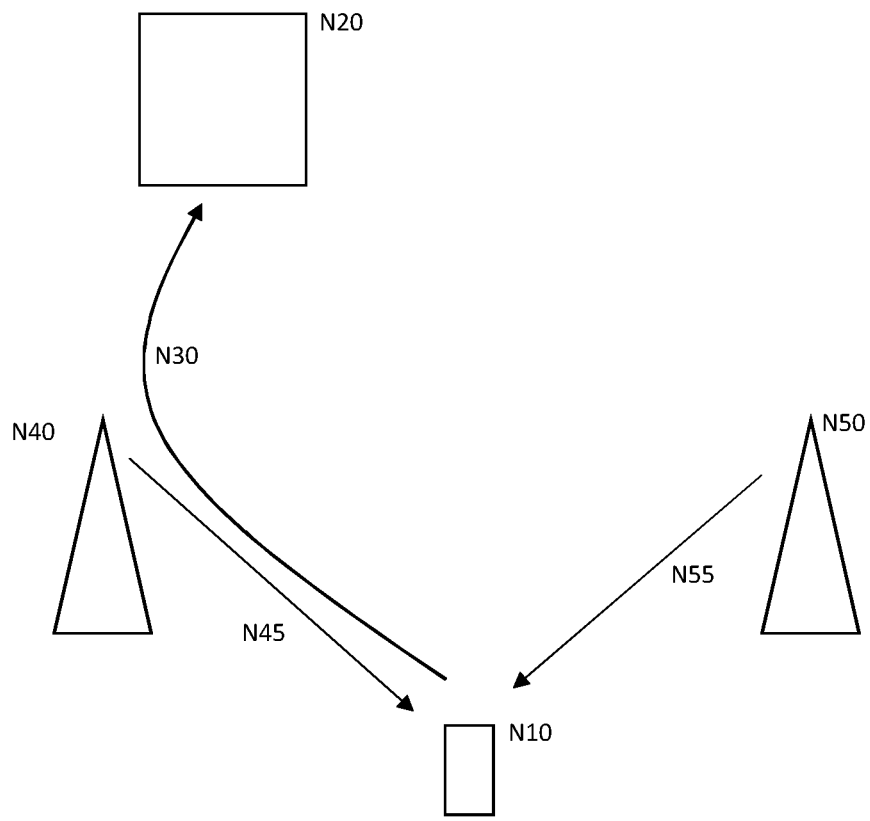
FIG. 4, showing an exemplary positioning architecture.

FIG. 3 shows a flowchart for an optional method of operating a network node, e.g. a BS or higher-layer node. In an optional action A200, the network node may request the device (UE) to provide capabilities associated to support for different positioning features, such as support for different PRS configurations, and a response may be obtained (received) in optional action A210. In an optional action A220, the network node may obtain one or more positioning reference signal configurations, e.g. from one or more radio network nodes (e.g., other BS) or other network node/s, e.g. a higher-layer node like a LMF or E-SMLC. In an action A230, the network node may provide one or more positioning reference signal configurations to a device like a UE or other BS or higher-layer node, in particular based on information obtained from another radio network node. Alternatively, or additionally the network node, in particular if it is a BS or radio network node, may transmit reference signaling according to a PRS configuration. In an action A240, the network node may obtain a report with an estimated radio condition associated to a positioning reference signal configuration and use this for positioning of the device, e.g. based on one or more PRS configurations, which may in general indicate PRS configurations used by one or more BSs, e.g. neighboring BSs.

In general, a network node like a BS may be aware of its own position, and/or may be aware of positions of neighboring nodes. The corresponding information may be stored in a memory accessible to the BS, and/or may be configured and/or configurable by another node, e.g. another radio/network node, and/or higher-layer node.

Figure 5:
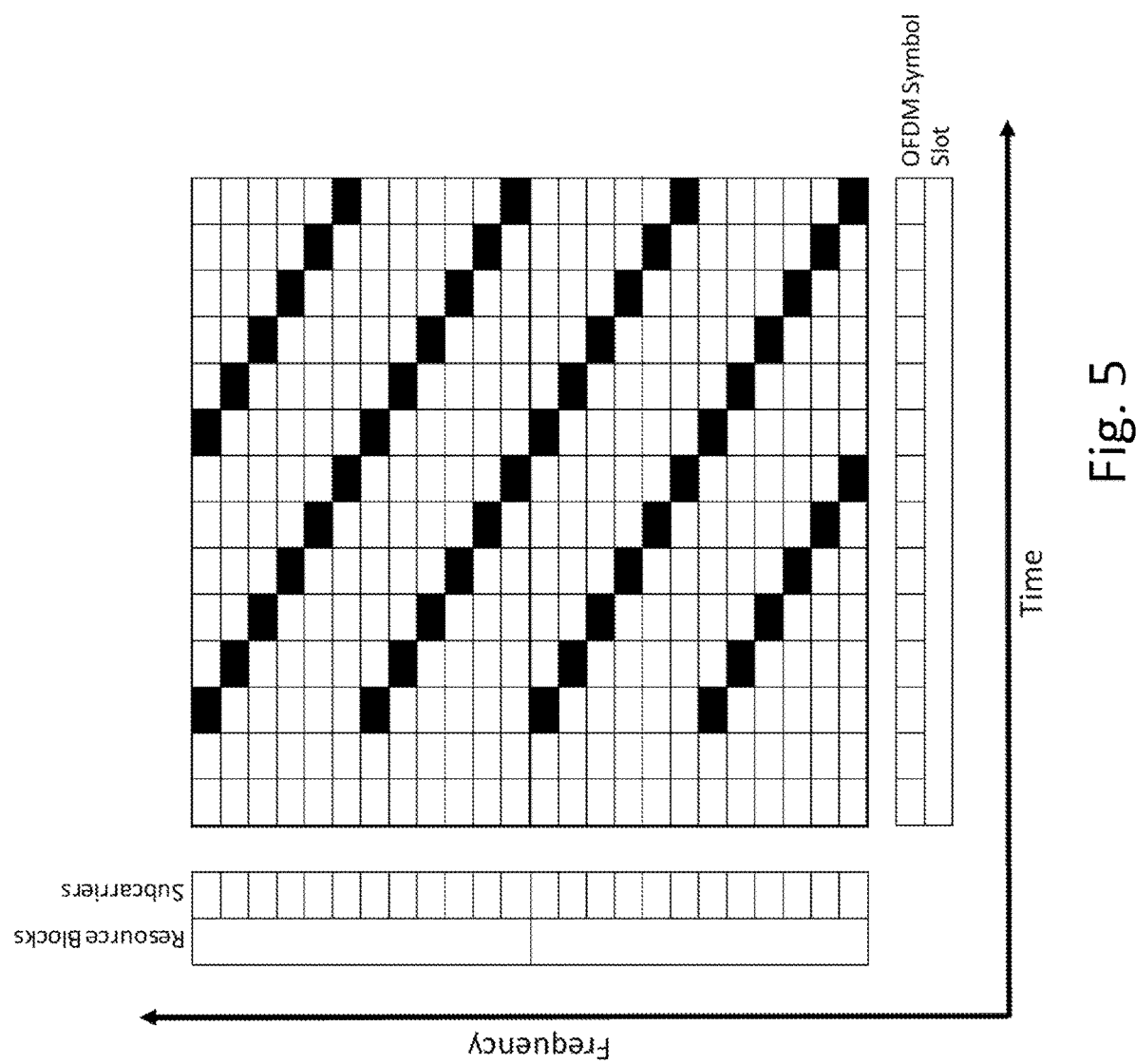
FIG. 5, showing an exemplary reference signaling structure.

FIG. 5 shows an example architecture, comprising a device like a UE N10, a network node like a base station N20, a communication interface N30 between the network node and the device (which may be bidirectional), radio network nodes, e.g. neighboring BSs, N40 and N50, positioning reference signals N45 and N55 transmitted by the nodes N40 and N50. Node N20 may also transmit PRS. It may be considered that device N10 uses the interface (which may be an air/radio interface, e.g. corresponding to NR-Uu) to report positioning information to the node N20. Positioning information may in general represent, and/or be based on CIR and/or TOA estimates performed on received PRS, for one or more base stations. In some cases, if the UE performs a position estimate itself, positioning information may correspond to the positioning information based on the CIR and/or TOA estimate/s.

According to approaches presented herein, an estimated channel impulse response may be made cleaner with a lower degree of false side lobes. The possible delay difference range may be up to the full symbol length, without any aliasing effects.

Approaches described herein allow for a wide range of different trade-offs between delay range, orthogonality and latency to be applied, e.g., optimized for the particular use case. Using comb factors 6 and 12 allows for a matching of frequency-domain cycle with resource block size, 12 REs in NR. This corresponds to two cycles (6) or one cycle (12).

Using comb factors 7 and 14 allows for a matching of time-domain cycles of the PRS and the NR slot length 14 symbols, e.g. one or two cycles in one slot.

The comb factors n=6, 7, 12 and 14 provide a large degree of orthogonality.

The proposed approaches allow for reduction or elimination of inter-symbol interference due to delays larger than the native NR CP in other parts of the overall signal. A reduction of CP overhead for the PRS signal may be achieved. Delays can introduce interference between signal that are orthogonal at zero delay difference. The proposed approaches facilitate reduction or elimination of such interference.

In general, a network node may transmit reference signaling, in particular PRS, according to a reference signaling configuration as described herein. The RS/PRS may be represented by a time series of RS/PRS occasions, each of which may contain one or more adjacent OFDM symbols, in particular with all symbols within an occasion having the same or essentially the same distribution of non-zero resource elements in frequency space, and/or representing the same sequence. Each PRS occasion is typically transmitted in one or more NR slots. Each slot may, e.g., contain 14 symbols, e.g. up to 14 PRS symbols.

The REs in the OFDM symbols of each PRS occasion may be organized in many different ways, depending on the context.

Each OFDM symbol of a PRS occasion may non-zero power REs regularly at every $n^{th}$ position, using a so-called comb-n and zero-power REs in other positions. The non-zero power REs may be power boosted with a certain boosting factor, which may be equal to n to maintain a constant power of the total transmitted signal, e.g. also including non-PRS parts. The boosting may also be lower or higher than this.

Different values of n of the comb-n may be applied depending on context, e.g. channel type, network topology, network and UE capabilities.

In successive OFDM symbols (and/or occasions), the comb-n pattern may be shifted in different ways, so that other subsets of sub-carriers are used. For a given comb-n, there may be frequency shifts between successive OFDM symbols. The process of successively shifting the comb-n is called staggering. The staggering may be employed in a regular way with shifts of a certain size k (e.g., k in subcarriers). One occasion of the basic PRS thus consists of one or more cycles of employing such staggered comb-n using shift=k in a regular way.

In one variant, using comb-n, these shifts are regular with k=1 sub-carrier per OFDM symbol. After a cycle of n symbols, all sub-carriers have then been equally used. After this there may come new cycles of OFDM symbols using the same structure. Staggering may be considered downward in frequency, or upward in frequency, which may be indicated with a positive or negative sign for k.

An example with a total of 12 symbols (in a slot), using comb-6 (5 zero REs and one non-zero RE in each comb instance) and k=1 is given in FIG. 5. The frequency-domain periodicity fits with the NR Physical Resource Block (PRB) size of 12 REs. One PRB may thereby host two such cycles.

Figure 6:
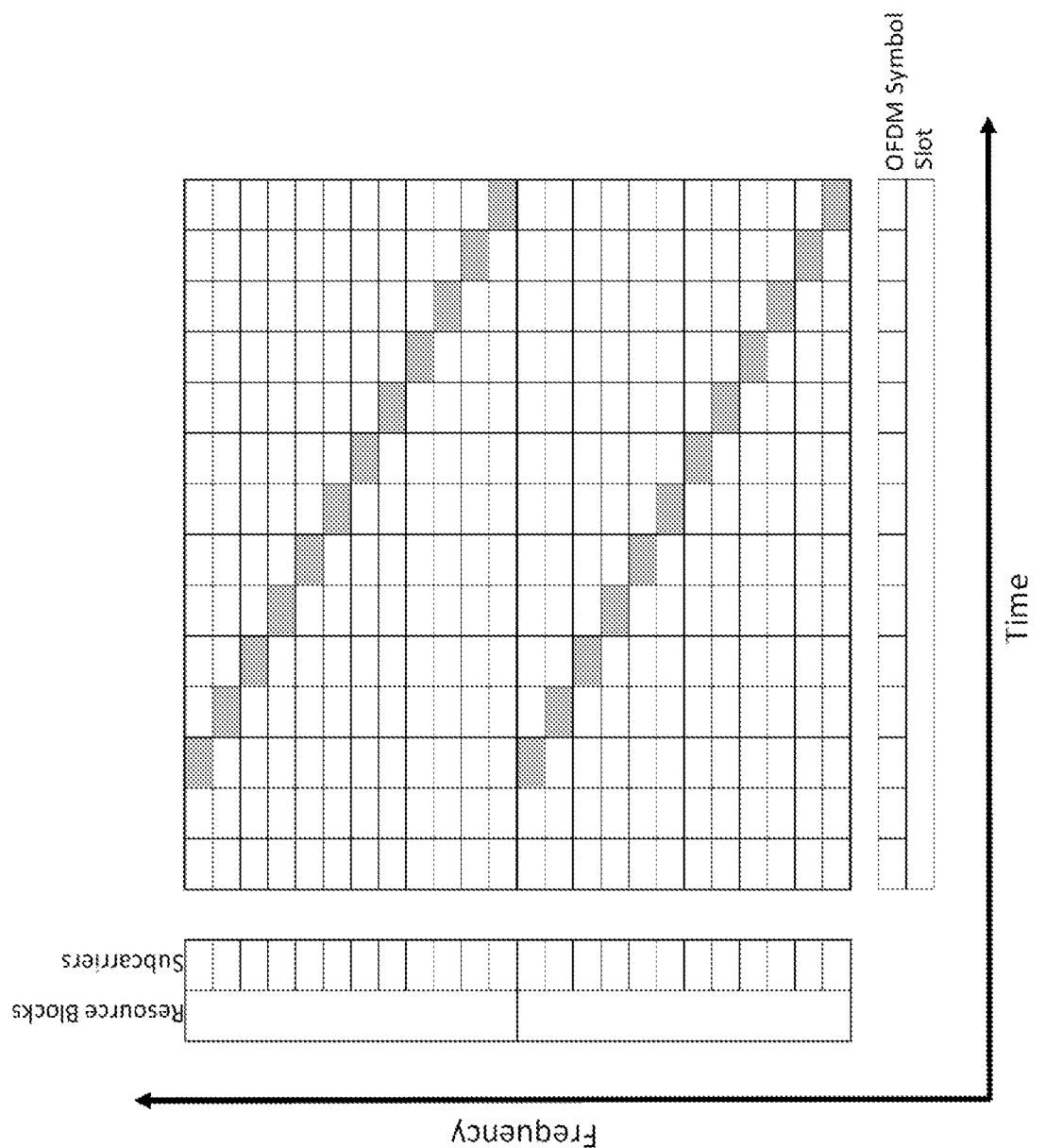
FIG. 6, showing another an exemplary reference signaling structure.

With n=12, as shown in FIG. 6, exactly one such cycle matches the PRB size.

Figure 7:
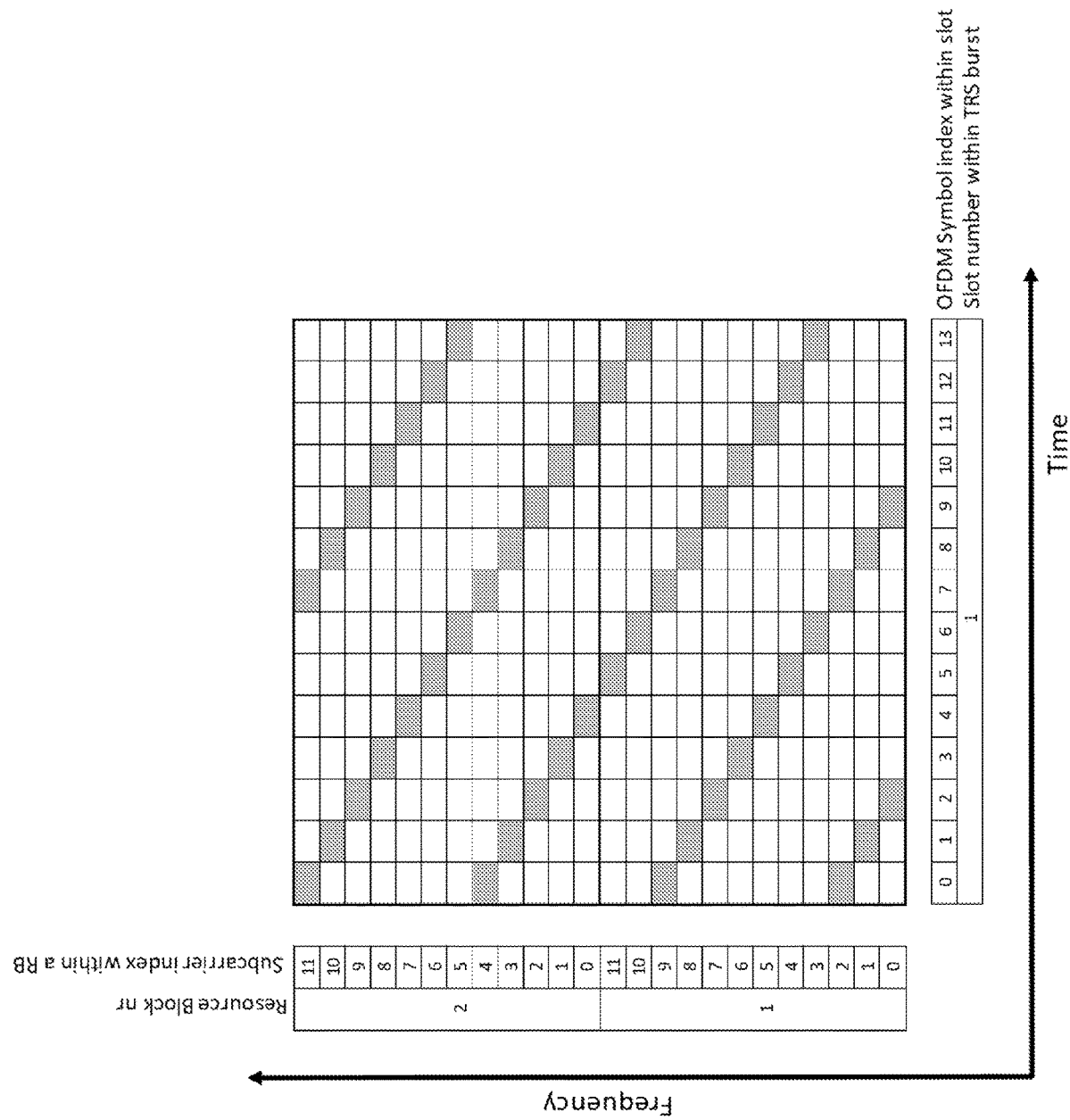
FIG. 7, showing another an exemplary reference signaling structure.

In another variant is may be considered to set n=7, which allows exactly two time cycles to fit within a 14-symbol slot in NR, as shown in FIG. 7.

Figure 8:
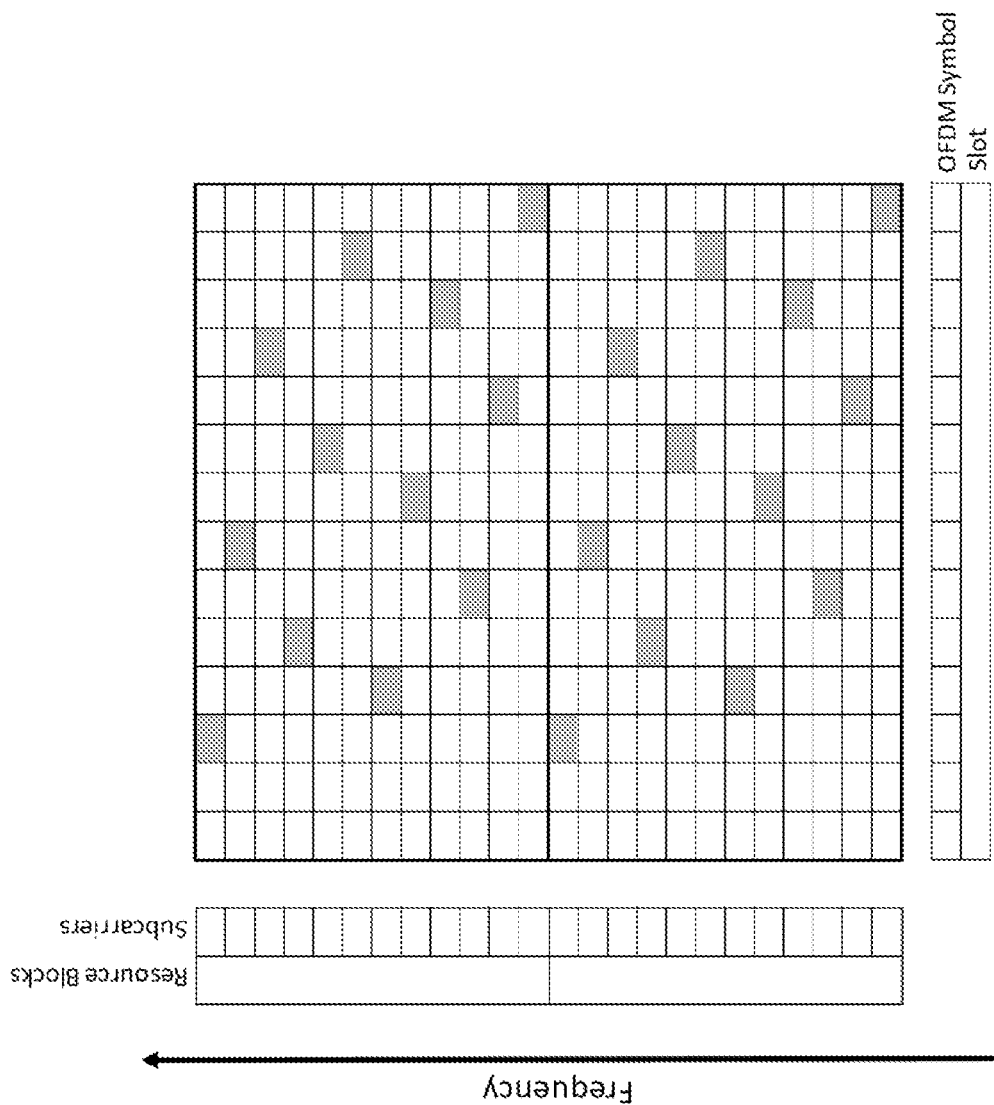
FIG. 8, showing another an exemplary reference signaling structure.
Figure 9:
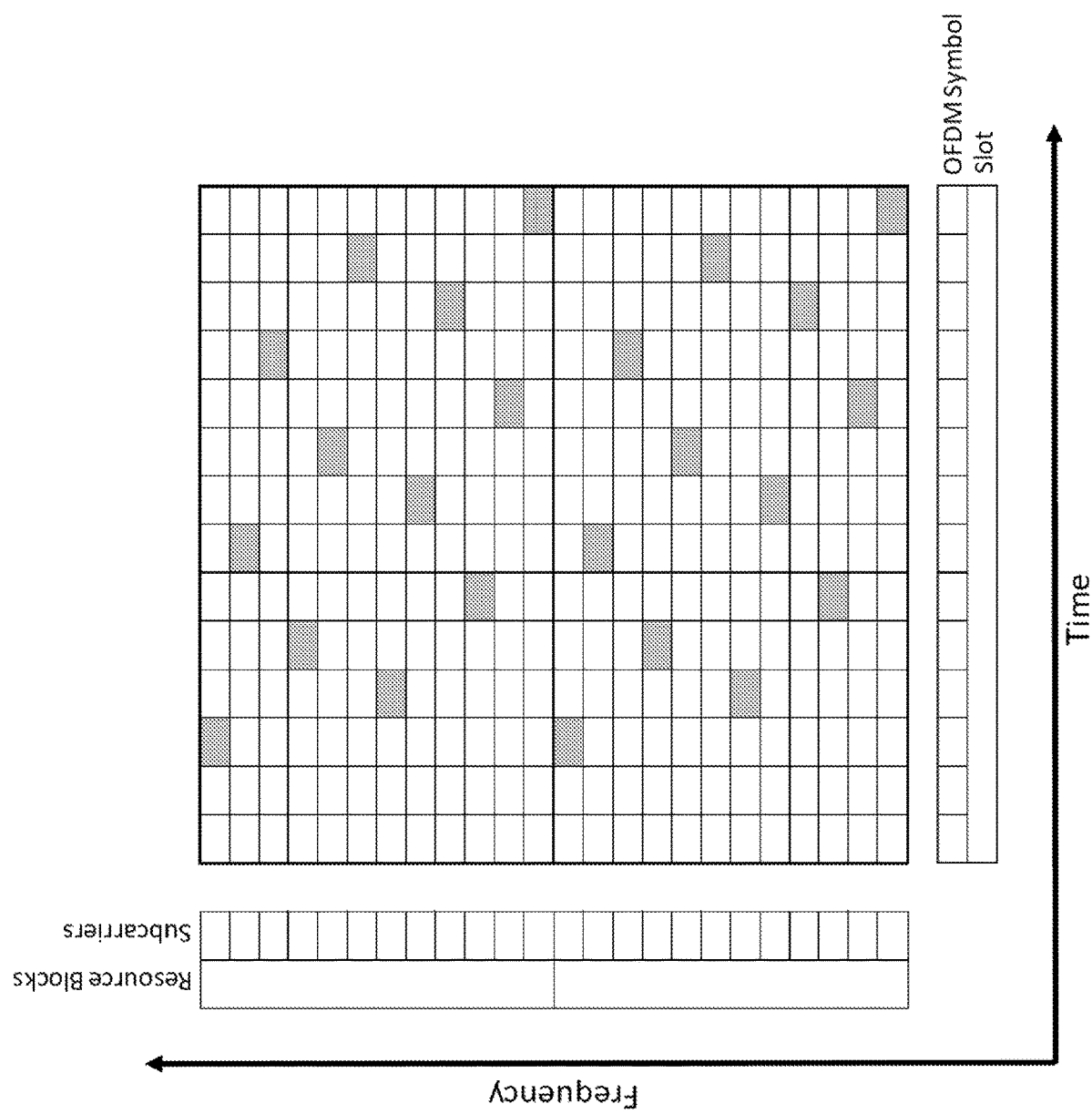
FIG. 9, showing another an exemplary reference signaling structure.

In yet another example, the same set of OFDM symbols, as in the regular staggered comb-6 described above, are re-ordered and transmitted in that modified order, see examples for n=6 in FIG. 8 and n=12 in FIG. 9.

The purpose of the re-ordering may e.g. be to allow a better TOA estimate for a limited number of received symbols when there are increased latency requirements and there is no time to wait for all PRS symbols to be received. In such cases, a UE may use a limited number of symbols, down to one, as the basis for the TOA estimation. The modified ordering may be done in such a way that for each value of number of received symbols, the received REs form as regular a pattern as possible, after time-averaging—on a per sub-carrier basis—of the received symbols. The missing RE positions may e.g., be found by frequency-domain interpolation. The resulting REs are then used in an Inverse Fourier Transform (IFFT) process, whereby the Channel Impulse Response may be obtained and TOA may be estimated. The drawback of the limited number of symbols is a reduced SINR and a somewhat limited delay range, due to the fact that not all RE positions are available. In some use cases the SINR may however be sufficient and the delay range may be limited to fit within the RE density of the received symbols, in which case good TOA estimation can be achieved with very short latency.

To address Inter-Symbol Interference (ISI), which may happen due to multi-path propagation, dedicated null (zero-power) symbols may be added just before the first PRS symbol in an occasion and/or just after the last symbol of an PRS occasion.

Figure 10:
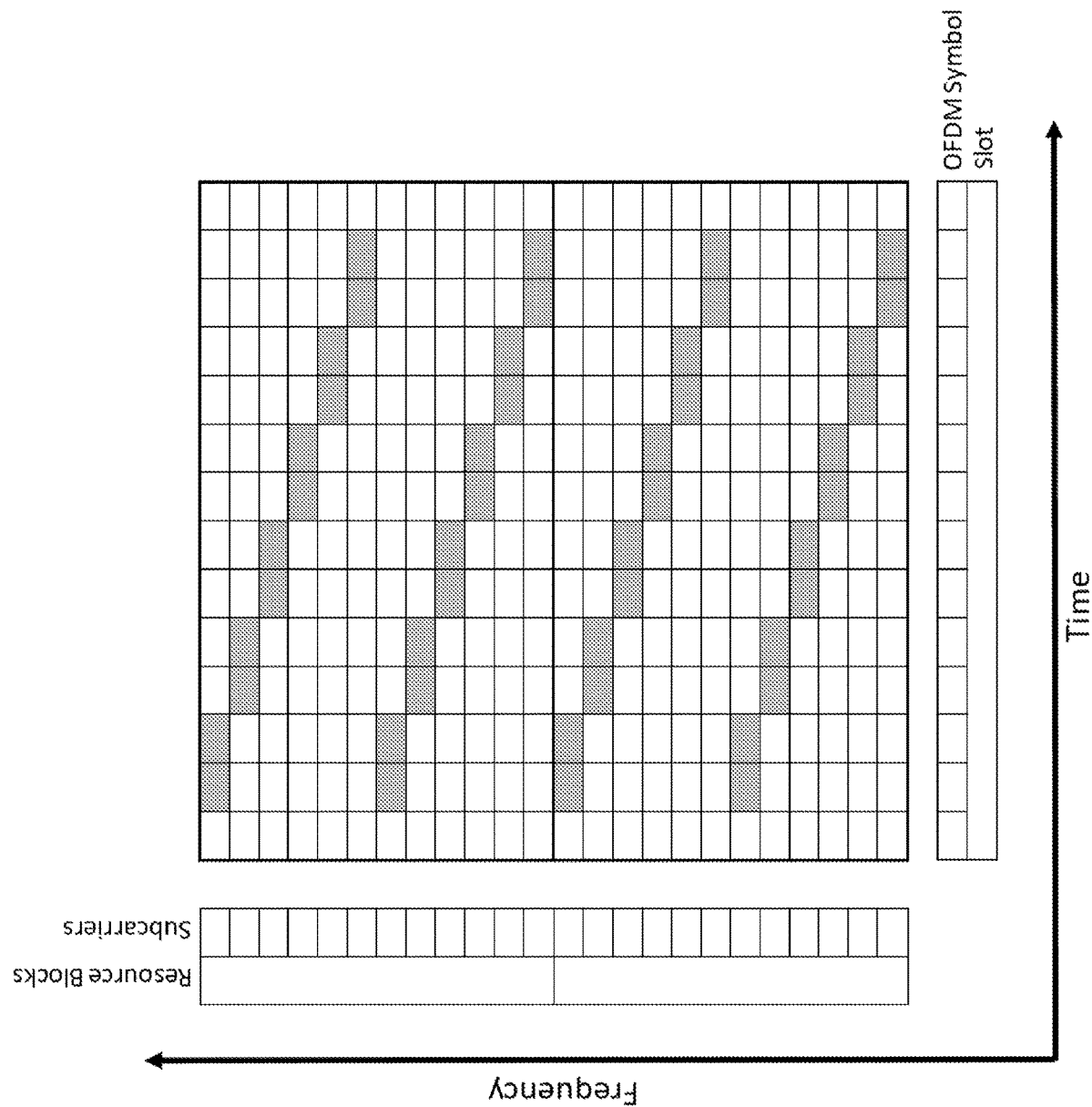
FIG. 10, showing another an exemplary reference signaling structure.

As an alternative, or in combination, a yet another re-ordering of the OFDM symbols may be applied, in such a way that a number m (m=2 or larger) of identical OFDM symbols are transmitted group-wise adjacent to each other. Each such group uses the same sub-carrier positions (same comb-shift), but after one such group there is a shift (staggering of a group of symbols). The following m symbols then use a new shift. This may continue until all used shift positions have been employed in the PRS occasion. Typically, this implies that a total of n×m symbols, or multiples thereof, are used to complete such a PRS occasion. Some advantages of this approach are that the first OFDM symbol of each group may serve as a CP for the second, and so on until the end of the group. The first symbol may or may not use a CP. If it does not use a CP, or if the CP is of inadequate length for the considered ISI, a UE may select m ISI-free subsets of the m OFDM symbols long group. This may imply some overlap between some of these subsets, which will result in some minor SNR degradation, which is typically much smaller than the gain in eliminated or reduced ISI. See FIG. 10 for an illustration of both zero-power symbols and group size m=2 and n=6.

Another example of grouping is to use exactly 15 symbols without CP within a 1 ms period (for sub-carrier spacing 15 kHz) or correspondingly shorter or longer time periods for other sub-carrier spacings. With 15 symbols one may e.g. have a group size of m=3 and comb-5 with k=1. Two such consecutive slots could fit 30 symbols, which could e.g. be arranged in comb-6 and groups of size m=5 and k=1, or comb-10 with groups size m=3 and k=1.

Grouping and re-ordering, as described above, may also be combined so that shifts between different groups appear with larger shifts than 1, e.g. as in the non-grouped case in FIG. 8.

There are generally described approaches of transmitting and/or using reference signaling (RS), in particular PRS. The RS/PRS may be according to a RS/PRS configuration.

In particular, reference signaling like PRS signals may be configured such that each OFDM symbol has a comb-n structure. The signaling may be boosted, e.g., the power of the non-power REs may be increased relative to other parts of the total transmitted signal, e.g., relative to SSB transmit power or relative to the average RE power when the BS transmits at maximum allowed power and in all REs within a symbol.

Successive OFDM symbols or symbol groups may be shifted, e.g. cyclically shifted, in frequency by an integer number k of sub-carrier positions.

It may be considered that transmission of PRS signals occurs as occasions with a number of consecutive PRS symbols or symbol groups.

In each occasion, all sub-carrier positions may be equally used, or almost equally used, e.g. such that at least 80% or at least 90% of the REs in a PRB used for the reference signaling are used the same number of times over a slot.

The comb factor n may be chosen (n=6 or n=12) to fit with the size of an NR PRB The cycle time of the comb staggering may be chosen (7 or 14) to fit with the number of slots (14) in an NR slot.

The OFDM symbols of a regular staggered comb-n with shift k may be re-ordered to allow a minimum latency and maximum time/frequency mobile performance to perform TOA estimation with a certain required SINR and delay range. It may be considered that the reordering is such that there is a pattern in time (covering more than one symbol) and frequency (covering one or more PRBs) that is repeated once or more (two occurrences or more) in each slot.

The OFDM symbols may be transmitted in groups of size m of identical OFDM symbols using a certain comb-n and shift k, followed by a number of additional such groups using another shift. Such transmission may be combined with a CP or used without a CP, in which case the symbols themselves will act as CP for each other.

Zero-power OFDM symbols may be introduced just before the first non-zero power OFDM symbol of the PRS occasion and/or just after the last such symbol.

The PRS may be combined with the use of code sequences to scramble PRS OFDM symbols differently from different BSs and across different symbols or symbol groups.

The PRS may be combined with the use of arbitrary muting, meaning BSs transmissions may be turned on and off according to a dedicated muting pattern per BS, which can be independently chosen for each BS, but where coordination is beneficial. Muting may be applied on a per-symbol basis or on a per-occasion basis.

Figure 11:
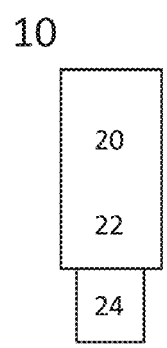
FIG. 11, showing an example of a radio node implemented as a terminal or UE.

FIG. 11 schematically shows a radio node, in particular a terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 12:
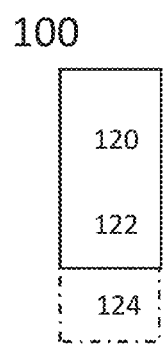
FIG. 12, showing an example of a radio node implemented as a network node, in particular a gNB.

FIG. 12 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, Positioning Reference Signaling (PRS), etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave)

frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories and/or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/ or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g.

transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgement information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| AMF | Access and Mobility Function |
| ARQ | Automatic Repeat reQuest |
| BS | Base Station |
| CAZAC | Constant Amplitude Zero Cross Correlation |
| CB | Code Block |
| CBG | Code Block Group |
| CDM | Code Division Multiplex |
| CM | Cubic Metric |
| CP | Cyclic Prefix |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |

-continued

| Abbreviation | Explanation |
|---|---|
| DM(-)RS | Demodulation reference signal(ing) |
| E-SMLC | Enhanced Service Mobile Location Center |
| FDD | Frequency Division Duplex |
| FDM | Frequency Division Multiplex |
| HARQ | Hybrid Automatic Repeat Request |
| IAB | Integrated Access and Backhaul |
| IFFT | Inverse Fast Fourier Transform |
| ISI | Inter-Symbol Interference |
| LCS | Location Services |
| LMF | Location Management Function |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OCC | Orthogonal Cover Code |
| OFDM/A | Orthogonal Frequency Division Multiplex/Multiple Access |
| OTDOA | Observed Time Difference of Arrival |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PRS | Positioning Reference Signal |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RAN | Radio Access Network |
| RAT | Radio Access Technology |
| RB | Resource Block |
| RRC | Radio Resource Control |
| SA | Scheduling Assignment |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TOA | Time Of Arrival |
| TB | Transport Block |
| TDD | Time Division Duplex |
| TDM | Time Division Multiplex |
| TDOA | Time Difference Of Arrival |
| TP | Transmission Point |
| UCI | Uplink Control Information |
| UE | User Equipment |
| URLLC | Ultra Low Latency High Reliability Communication |
| VL-MIMO | Very-large multiple-input-multiple-output |
| Xn | Interface between base stations |
| ZF | Zero Forcing |

Abbreviations may be considered to follow 3GPP usage if applicable.

The invention claimed is:

1. A method of operating a network node in a radio access network, the method comprising:
transmitting reference signaling based on a reference signaling configuration, the reference signaling configuration corresponding to a comb-n structure for a symbol group of a slot, and the reference signaling configuration corresponding to at least one of a staggered and a re-ordered comb-n structure for one or more other symbol groups of the slot; and
the reference signaling configuration further comprising one or both of:
a symbol group having a length of m in symbols, wherein one of m=1 and m=2; and
a staggered comb-n structure corresponding to a frequency distribution over a symbol group shifted by k subcarriers for each shift in time corresponding to a length of the symbol group, wherein k is one of k=1, k=2, k=−1, k=−2, k=7, k=−7, k=14 and k=−14.

2. A network node for a radio access network, the network node configured to:
transmit reference signaling based on a reference signaling configuration, the reference signaling configuration corresponding to a comb-n structure for a symbol group of a slot, and the reference signaling configuration corresponding to at least one of a staggered and a re-ordered comb-n structure for one or more other symbol groups of the slot; and
the reference signaling configuration further comprising one or both of:
a symbol group having a length of m in symbols, wherein one of m=1 and m=2; and
a staggered comb-n structure corresponding to a frequency distribution over a symbol group shifted by k subcarriers for each shift in time corresponding to a length of the symbol group, wherein k is one of k=1, k=2, k=−1, k=−2, k=7, k=−7, k=14 and k=−14.

3. A method of operating a user equipment in a radio access network, the method comprising:
receiving reference signaling based on a reference signaling configuration, the reference signaling configuration corresponding to a comb-n structure for a symbol group of a slot, and the reference signaling configuration corresponding to at least one of a staggered and a re-ordered comb-n structure for one or more other symbol groups of the slot; and
the reference signaling configuration further comprising one or both of:
a symbol group having a length of m in symbols, wherein one of m=1 and m=2; and
a staggered comb-n structure corresponding to a frequency distribution over a symbol group shifted by k subcarriers for each shift in time corresponding to a length of the symbol group, wherein k is one of k=1, k=2, k=−1, k=−2, k=7, k=−7, k=14 and k=−14.

4. A wireless device for a radio access network, the wireless device configured to:
receive reference signaling based on a reference signaling configuration, the reference signaling configuration corresponding to a comb-n structure for a symbol group of a slot, and the reference signaling configuration corresponding to at least one of a staggered and a re-ordered comb-n structure for one or more other symbol groups of the slot; and
the reference signaling configuration further comprising one or both of:
a symbol group having a length of m in symbols, wherein one of m=1 and m=2; and
a staggered comb-n structure corresponding to a frequency distribution over a symbol group shifted by k subcarriers for each shift in time corresponding to a length of the symbol group, wherein k is one of k=1, k=2, k=−1, k=−2, k=7, k=−7, k=14 and k=−14.

5. The method according to claim 1, wherein all symbol groups in a slot have the same duration in number of symbols.

6. The method according to claim 1, wherein a re-ordered comb-n structure corresponds to a time/frequency distribution of reference signaling that is achieved by redistributing symbol groups of a staggered comb-n structure in the slot.

7. The method according to claim 1, wherein a reordered comb-n structure corresponds to a time/frequency distribution of reference signaling covering a plurality of symbol groups being repeated at least once in a slot.

8. The method according to claim 1, wherein the comb-n is a comb-6.

9. The method according to claim 1, wherein the comb-n is a comb-12.

10. The method according to claim 1, wherein the reference signaling is power-boosted.

11. The method according to claim 1, wherein, in time domain, at least one of before and after a non-zero power resource element of a symbol group, there is a zero-power resource element.

12. A non-transient computer storage medium storing executable computer program instructions configured to cause processing circuitry to at least one of control and perform a method, the method comprising:

transmitting reference signaling based on a reference signaling configuration, the reference signaling configuration corresponding to a comb-n structure for a symbol group of a slot, and the reference signaling configuration corresponding to at least one of a staggered and a re-ordered comb-n structure for one or more other symbol groups of the slot; and the reference signaling configuration further comprising one or both of:

a symbol group having a length of m in symbols, wherein one of m=1 and m=2; and a staggered comb-n structure corresponding to a frequency distribution over a symbol group shifted by k subcarriers for each shift in time corresponding to a length of the symbol group, wherein k is one of k=1, k=2, k=−1, k=−2, k=7, k=−7, k=14 and k=−14.

13. The method according to claim 3, wherein all symbol groups in a slot have the same duration in number of symbols.

14. The method according to claim 3, wherein a re-ordered comb-n structure corresponds to a time/frequency distribution of reference signaling that is achieved by redistributing symbol groups of a staggered comb-n structure in the slot.

15. The method according to claim 3, wherein a reordered comb-n structure corresponds to a time/frequency distribution of reference signaling covering a plurality of symbol groups being repeated at least once in a slot.

16. The method according to claim 3, wherein the comb-n is a comb-6.

* * * * *